Aug. 4, 1931.   H. J. KERR ET AL   1,817,627
FEED DEVICE
Filed March 12, 1927
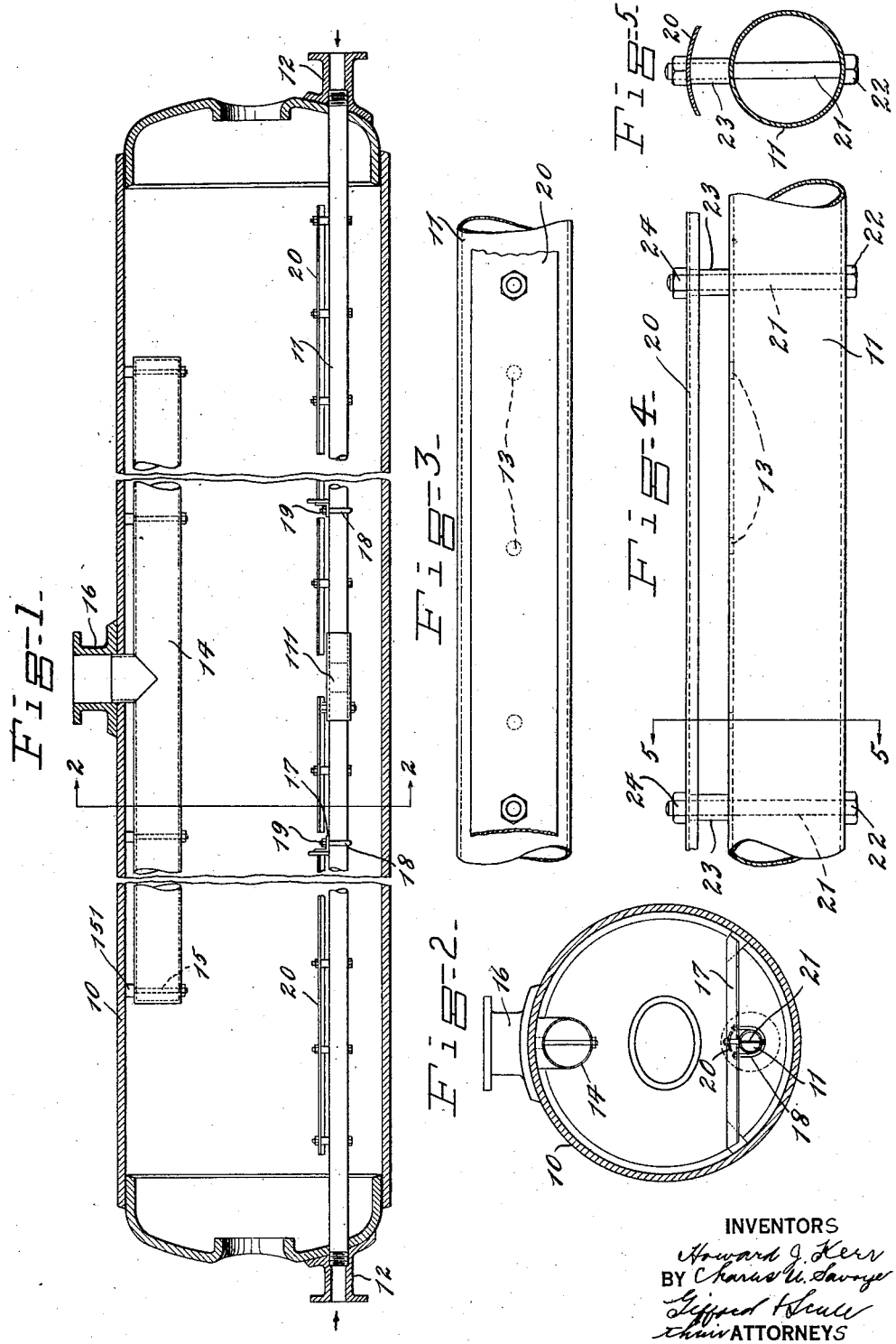
INVENTORS
Howard J. Kerr
BY Charles U. Savoye
Gifford Scull
their ATTORNEYS Patented Aug. 4, 1931

1,817,627

UNITED STATES PATENT OFFICE

HOWARD J. KERR, OF WESTFIELD, AND CHARLES U. SAVOYE, OF HACKENSACK, NEW JERSEY, ASSIGNORS TO THE BABCOCK & WILCOX COMPANY, OF BAYONNE, NEW JERSEY, A CORPORATION OF NEW JERSEY

FEED DEVICE

Application filed March 12, 1927. Serial No. 174,890.

Our invention relates to new and useful improvements in feed devices for a drum, and particularly for a steam and water drum of a steam boiler.

Our invention will best be understood by reference to the accompanying drawings, in which we have illustrated one embodiment thereof and in which Fig. 1 is a longitudinal section of a steam and water drum embodying our invention; Fig. 2 is a section taken on the plane of line 2—2 of Fig. 1; Fig. 3 is a fragmentary plan view of a portion of the feed pipe and the baffle located above the same; Fig. 4 is a side view of Fig. 3, and Fig. 5 is a section taken on the plane of the line 5—5 of Fig. 4.

Like reference characters indicate like parts throughout the drawings.

Referring now to the drawings, 10 is a drum and here illustrated as a steam and water drum for use with a steam boiler (not illustrated). A feed pipe 11 extends longitudinally of the drum and is here illustrated as formed of two sections connected by a telescoping sleeve 111, the feed pipe being illustrated as passing through both ends of the drum and connected at its ends to appropriate feed water supply connections 12. The feed pipe is located below the normal water level in the drum, as best shown in Figs. 1 and 2.

The feed pipe is provided on its upper side with perforations 13 through which the feed water flows into the steam and water drum. In the upper portion of the steam and water drum is located a dry pipe 14 suitably supported as by bolts 15 passing therethrough and which may be connected to the upper portion of the steam and water drum, suitable spacers 151 being located between the dry pipe and the drum sheet. The dry pipe 14 is connected to the steam outlet 16 in the usual manner.

The feed pipe is preferably supported by members 17, which are illustrated as angles extending transversely of the drum and which may be, if desired, secured at their ends to lugs welded to the inner side of the drum. The feed pipe is supported from the members 17 by U-shaped straps 18, two of which are illustrated in Fig. 1, the legs of the straps passing through the members 17 and nuts 19 serving to clamp the feed pipe in position against the members 17.

In order to prevent water issuing from the perforations 13 in the feed pipe from being sprinkled into the dry pipe, and into the steam in the steam and water drum, thereby increasing the percentage of moisture in the steam, we have provided a baffle 20 located in front of the perforations 13 and between said perforations and the dry pipe, thereby preventing the water issuing from said perforations from reaching the dry pipe itself. Preferably, the side of the baffle facing the perforations 13 is concave in form as at 201 (see Fig. 5). The baffle or baffles are preferably secured in position by means of bolts 21 passing through the feed pipe and provided at their lower ends with heads 22, the upper ends of the bolts passing through openings in the baffle 20, spacers 23 being interposed between said baffle and the feed pipe. Nuts 24 on the upper ends of said bolts serve to clamp the baffle plate in position.

Furthermore, by placing the baffle, which is preferably concave, above the feed pipe, the feed water which finds its way through the boiler water, is prevented from contacting with the drum sheet and thereby setting up strains therein and bringing about leakage.

It will, of course, be understood that various modifications and changes may be made in the described device without departing from the spirit of our invention and without exceeding the scope of our claims.

We claim:

1. In combination, a drum, a steam outlet therefor, a feed pipe located near the bottom and below the normal water level of said drum and extending longitudinally thereof, said feed pipe being provided with a multiplicity of perforations spaced along said feed pipe, a feed connection for supplying feed water to said feed pipe, and a baffle plate located above said feed pipe and against which the feed water impinges to prevent its contacting with the drum sheet.

2. In combination, a drum, a feed pipe located near the bottom and below the normal water level of said drum and extending longitudinally thereof, said feed pipe being provided with perforations spaced along said feed pipe, a feed connection for supplying feed water to said feed pipe, and a baffle plate for deflecting the feed water issuing from said feed pipe away from the drum sheet, said baffle plate having a concave side facing said perforations.

3. In combination, a drum, a feed pipe located near the bottom of said drum and extending longitudinally thereof, said feed pipe being provided with perforations spaced along said feed pipe for directing jets of feed water upwards towards the center of the drum, a feed connection for supplying feed water to said feed pipe, a dry pipe located in the upper portion of said drum, and a baffle plate supported by bolts passing through said feed pipe and located between said perforations and the dry pipe for deflecting the feed water issuing from said feed pipe.

4. In combination, a drum, a feed pipe located near the bottom of said drum and extending longitudinally thereof, said feed pipe being provided with perforations spaced along said feed pipe for directing jets of feed water upwards towards the center of the drum, a feed connection for supplying feed water to said feed pipe, a steam outlet located in the upper portion of said drum, a baffle plate supported by said feed pipe and located between said perforations and said steam outlet for deflecting the feed water issuing from said feed pipe.

HOWARD J. KERR.
CHARLES U. SAVOYE.